(12) United States Patent
Yamashita et al.

(10) Patent No.: US 7,008,099 B2
(45) Date of Patent: Mar. 7, 2006

(54) LIGHT SOURCE DEVICE

(75) Inventors: Tomoyoshi Yamashita, Kanagawa (JP); Issei Chiba, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/984,769

(22) Filed: Nov. 10, 2004

(65) Prior Publication Data

US 2005/0105283 A1 May 19, 2005

Related U.S. Application Data

(63) Continuation of application No. 10/012,394, filed on Dec. 12, 2001, now Pat. No. 6,874,902.

(30) Foreign Application Priority Data

| Dec. 13, 2000 | (JP) | ............................. 2000-379089 |
| Oct. 11, 2001 | (JP) | ............................. 2001-314149 |
| Oct. 23, 2001 | (JP) | ............................. 2001-325205 |

(51) Int. Cl.
*F21V 7/04* (2006.01)

(52) U.S. Cl. ...................... 362/620; 362/330; 362/339; 362/331; 362/600

(58) Field of Classification Search ................. 362/31, 362/600, 601, 602, 620, 628, 625, 330, 339, 362/331; 349/112; 359/619, 623, 625, 626, 359/631, 633, 634, 635, 636, 637
See application file for complete search history.

(56) References Cited

U.S. PATENT DOCUMENTS 3,716,709 A    2/1973    Taltavull ..................... 362/330

5,552,907 A *  9/1996    Yokota et al. ................ 349/62
6,104,854 A *  8/2000    Masaki et al. .............. 385/133

(Continued)

FOREIGN PATENT DOCUMENTS

JP          2-84618        3/1990

(Continued)

*Primary Examiner*—Sandra O'Shea
*Assistant Examiner*—Anabel Ton
(74) *Attorney, Agent, or Firm*—Morgan, Lewis & Bockius LLP

(57) ABSTRACT

A light source device having a light guide (3) for guiding light emitted from a primary light source and emitting light obliquely from a light emission face (33) thereof, and a light deflecting device (4) disposed so as to be adjacent to the light emission face. Plural elongated prisms are arranged in parallel to one another at a light incident surface (41) of the light deflecting device. Virtual elongated prisms (I) each having a vertical angle θ of 50 to 70° arranged in the same arrangement pitch as the elongated prisms are assumed so that the peak emission light in the light emission distribution of light emitted from the light emission face is incident on one virtual prism face of the virtual elongated prism, internally totally reflected by another virtual prism face and then emitted in a desired direction from a light emission surface (42) of the light deflecting device. A prism face of each elongated prism at the far side from the primary light source is designed to have a convex surface shape with respect to the shape of the virtual elongated prism. The value (r/P) of the radius of curvature r normalized by the arrangement pitch P is equal to 7 to 30, and the ratio (d/P) of the maximum distance between the convex-surface-shaped prism face of the elongated prism and the virtual prism face to the arrangement pitch P is equal to 0.05 to 5%.

12 Claims, 3 Drawing Sheets

U.S. PATENT DOCUMENTS

| | | | |
|---|---|---|---|
| 6,280,043 B1 * | 8/2001 | Ohkawa | 362/626 |
| 6,384,881 B1 | 5/2002 | Arai et al. | 349/65 |
| 2002/0114149 A1 * | 8/2002 | Yamashita et al. | 362/31 |

FOREIGN PATENT DOCUMENTS

| | | |
|---|---|---|
| JP | 7-201217 | 8/1995 |
| JP | 09-105804 A | 4/1997 |
| JP | 9-507584 A | 7/1997 |
| JP | 11-038209 A | 2/1999 |
| JP | 2000-035763 A | 2/2000 |
| JP | 2000-106022 A | 4/2000 |
| JP | 2001-143515 A | 5/2001 |
| WO | WO 96/11358 | 4/1996 |
| WO | WO 97/17631 | 5/1997 |

* cited by examiner

LIGHT EMISSION DISTRIBUTION OF LIGHT EMITTED FROM LIGHT EMISSION SURFACE 42 OF LIGHT DEFLECTING DEVICE 4

LIGHT EMISSION DISTRIBUTION OF LIGHT EMITTED FROM LIGHT EMISSION FACE 33 OF LIGHT GUIDE 3

LIGHT SOURCE DEVICE

This application is a continuation of application Ser. No. 10/012,394 filed on Dec. 12, 2001 now U.S. Pat. No. 6,874,902, which is hereby incorporated by reference in its entirety.

FIELD OF THE INVENTION

The present invention relates to an edge-lighting type light source device constituting a liquid crystal display device or the like which is used as a display device for a portable note-type personal computer, a liquid crystal television or the like, and particularly to an improvement of a light deflecting device arranged at a light emission face side of a light guide.

DESCRIPTION OF THE RELATED ART

Recently, color liquid crystal display devices have been broadly used as monitors for a portable note-type personal computer, a personal computer, etc. or as display devices for a liquid crystal television, a video-installed liquid crystal television, etc. in various fields. Further, increase of the amount of information to be processed, diversity of needs, requirements of supporting multimedia are positively promoting enlargement of the screens and enhancement of high definition in the liquid crystal display devices.

A liquid crystal display device is basically constructed by a back light portion and a liquid crystal device portion. As the back light portion is known an under-lighting type back light portion in which a light source is disposed just under the liquid crystal device portion, or an edge-lighting type back light portion in which a light source is disposed so as to face the side end face of a light guide. The edge-lighting type is more frequently used from the viewpoint of the compact design of the liquid crystal display device.

A display device having a relatively small screen size and a relatively narrow viewing range in the viewing direction (hereinafter referred to as "viewing angle"), for example, a liquid crystal display device used as a display portion for a cellular phone or the like, has used an edge-lighting type back light portion that is designed from the viewpoint of reduction of power consumption such that the expanding angle of light flux emitted from the screen is reduced to be as less as possible so that the light can be concentratively emitted to a required angle range to effectively use the amount of light emitted from a primary light source.

For example, the applicant of this application has proposed a light source device which has a limited viewing angle and emits light concentratively to a relatively narrow range to enhance effective use of the light amount of the primary light source and reduce the power consumption in Japanese Patent Application No. 2000-265574 (not prior art). In the light source device of this application, there is used a prism sheet having prism surfaces formed on both the surfaces thereof so as to be disposed adjacent to the light emission face of a light guide. In this double-sided prism sheet, plural elongated prisms arranged in parallel to one another are formed on each of a light incident surface (one surface of the prism sheet) and a light emission surface (the other surface of the prism sheet), the directions of the elongated prisms are coincident between the light incident surface and the light emission surface, and the elongated prisms of the light incident and light emission surfaces are disposed in corresponding positional relationship with each other. Accordingly, light that is emitted from the light emission face of the light guide while distributed in a proper angle range and has a light emission peak in a direction oblique to the light emission face is incident from one prism face on the light incident surface of the prism sheet, internally reflected by the other prism face and further made to suffer a refractive action of the prism on the light emission surface of the prism sheet, thereby concentratively emitting the light to a relatively narrow required direction.

With the light source device described above, the concentrative light emission in the narrow angle range can be performed. However, in this apparatus, it is required that plural elongated prisms arranged in parallel to one another are disposed on both the surfaces of the prism sheet used as a light deflecting device so that the prism direction is coincident between the light incident surface and the light emission surface of the prism sheet and also the elongated prisms on the light incident and emission surfaces are disposed in corresponding positional relationship with each other. Therefore, the molding process is complicated.

Furthermore, there is proposed a prism sheet provided with elongated prisms each having a prism face of convex surface shape at a side far from the light source in JP(A)-9-507584, JP(A)-9-105804, JP(A)-11-38209 and JP(A)-2000-35763. This prism sheet is intended to enhance concentrative and directive properties of the light when the prism sheet is used for deflecting the light emitted from the light guide. However, the prism faces of convex surface shape described in the above patent publications are relatively too large or too small in the radius of curvature, and therefore it is not sufficient to narrow the distribution of light emitted from the light guide, or it excessively narrow the distribution or often broaden the distribution. In addition, with respect to the light guides described in the above patent publications, they have light emission function which achieve not so high directivity in the emitted light distribution and therefore the emitted light becomes to have relatively broad distribution, so that the sufficient enhancement in luminance cannot be achieved even if the light emitted from the light guide is concentrated with use of the prism sheet.

SUMMARY OF THE INVENTION

Therefore, an object of the present invention is to provide a light source device with which a distribution of emitted light is controlled to be very narrow, a using efficiency of the light amount of a primary light source can be enhanced (that is, the efficiency at which light emitted from the primary light source is concentratively emitted to a required viewing direction is high), the luminance is very high and image quality can be easily enhanced with a simple construction.

In order to attain the above object, according to the present invention, there is provided a light source device comprising: a primary light source; a light guide having a light incident face on which light emitted from the primary light source is incident, guiding the incident light, and having a light emission face from which the incident light is emitted; and a light deflecting device disposed so as to be adjacent to the light emission face of the light guide, wherein the light deflecting device has a light incident surface disposed so as to face the light emission face of the light guide and a light emission surface at the opposite side to the light incident surface, plural elongated prisms arranged in parallel to one another are formed on the light incident surface of the light deflecting device, each of the elongated prisms has two prism faces, and when there are assumed plural virtual elongated prisms arranged at the same arrangement pitch as the elongated prisms of the light deflecting device, each virtual elongated prism having a vertical angle θ of 50 to 70°, and the peak emission light in the light emission distribution of light emitted from the light emission face of the light guide being incident on one virtual prism face of the virtual elongated prism, internally totally reflected by another virtual prism face and then emitted in a desired direction from the light emission surface, at least prism face of each elongated prism at the far side from the primary light source is designed to have a convex surface shape with respect to the shape of each of the virtual elongated prisms, the convex surface shape being set to such a condition that the value (r/P) of the radius of curvature r normalized by the arrangement pitch P of the elongated prisms is equal to 7 to 30.

In an aspect of the present invention, the ratio (d/P) of the maximum distance between the convex-surface-shaped prism face of each of the elongated prisms of the light deflecting device and the virtual prism face of each virtual elongated prism to the arrangement pitch P of the elongated prisms is equal to 0.05 to 5%. In an aspect of the present invention, a slant angle of a virtual prism face of each of the virtual elongated prisms at the near side to the primary light source is 45° or more. In an aspect of the present invention, each of the virtual elongated prisms has an equilateral triangular cross-section. In an aspect of the present invention, the light emission face of the light guide and/or the back surface of the light guide at the opposite side to the light emission face is a surface having a directive light emission function. In an aspect of the present invention, an average slant angle of the surface having the directive light emission function is 0.5 to 15°. In an aspect of the present invention, the surface having the directive light emission function is a roughened surface or a surface having many elongated lens arranged thereon.

In order to attain the above object, according to the present invention, there is also provided a light source device comprising: a primary light source; a light guide having a light incident face on which light emitted from the primary light source is incident, guiding the incident light, and having a light emission face from which the incident light is emitted; and a light deflecting device disposed so as to be adjacent to the light emission face of the light guide, wherein the light deflecting device has a light incident surface disposed so as to face the light emission face of the light guide and a light emission surface at the opposite side to the light incident surface, plural elongated prisms arranged in parallel to one another are formed on the light incident surface of the light deflecting device, each of the elongated prisms has two prism faces, and when there are assumed plural virtual elongated prisms arranged at the same arrangement pitch as the elongated prisms of the light deflecting device, each virtual elongated prism having a vertical angle θ of 50 to 70°, and the peak emission light in the light emission distribution of light emitted from the light emission face of the light guide being incident on one virtual prism face of the virtual elongated prism, internally totally reflected by another virtual prism face and then emitted in a desired direction from the light emission surface, at least prism face of each elongated prism at the far side from the primary light source is designed to have a convex surface shape with respect to the shape of each of the virtual elongated prisms, the ratio (d/P) of the maximum distance between the convex-surface-shaped prism face and the virtual prism face of each virtual elongated prism to the arrangement pitch P of the elongated prisms is equal to 0.2 to 2%.

In an aspect of the present invention, each of the elongated prisms has a common base with each virtual elongated prism, and the convex surface shape is set to a substantially cylindrical surface shape under the condition that the value (r/P) of the radius of curvature r normalized by the arrangement pitch P of the elongated prisms is equal to 2 to 80. In an aspect of the present invention, a slant angle of a virtual prism face of each of the virtual elongated prisms at the near side to the primary light source is 45° or more. In an aspect of the present invention, each of the virtual elongated prisms has an equilateral triangular cross-section. In an aspect of the present invention, the light emission face of the light guide and/or the back surface of the light guide at the opposite side to the light emission face is a surface having a directive light emission function. In an aspect of the present invention, an average slant angle of the surface having the directive light emission function is 0.5 to 15°. In an aspect of the present invention, the surface having the directive light emission function is a roughened surface or a surface having many elongated lens arranged thereon.

In order to attain the above object, according to the present invention, there is also provided a light source device comprising: a primary light source; a light guide having a light incident face on which light emitted from the primary light source is incident, guiding the incident light, and having a light emission face from which the incident light is emitted; and a light deflecting device disposed so as to be adjacent to the light emission face of the light guide, wherein the light deflecting device has a light incident surface disposed so as to face the light emission face of the light guide and a light emission surface at the opposite side to the light incident surface, plural elongated prisms arranged in parallel to one another are formed on the light incident surface of the light deflecting device, each of the elongated prisms has two prism faces, and at least one prism face of each elongated prism of the light deflecting device is designed in such a convex surface shape as to have a slant angle larger than the slant angle of at least a part of a virtual prism face of a virtual elongated prism to the light emission surface in an area nearer to the light emission surface than the position at which virtual light skirting the apex portion of a neighboring virtual elongated prism to pass in the direction of the peak emission light of the light emission distribution of light emitted from the light emission face of the light guide is internally totally reflected by the virtual prism face of the virtual elongated prism.

In an aspect of the present invention, each of the elongated prisms has a common base with each virtual elongated prism, and the convex surface shape is set to a substantially cylindrical surface shape under the condition that the value (r/P) of the radius of curvature r normalized by the arrangement pitch P of the elongated prisms is equal to 2 to 80. In an aspect of the present invention, the ratio (d/P) of the maximum distance between the convex-surface-shaped prism face of each of the elongated prisms of the light deflecting device and the virtual prism face of each virtual elongated prism to the arrangement pitch P of the elongated prisms is equal to 0.05 to 5%. In an aspect of the present invention, a slant angle of a virtual prism face of each virtual elongated prism at the near side to the primary light source is 45° or more. In an aspect of the present invention, each virtual elongated prism has an equilateral triangular cross-ssection. In an aspect of the present invention, the light emission face of the light guide and/or the back surface of the light guide at the opposite side to the light emission face is a surface having a directive light emission function. In an aspect of the present invention, an average slant angle of the surface having the directive light emission function is 0.5 to 15°. In an aspect of the present invention, the surface having the directive light emission function is a roughened surface or a surface having many elongated lens arranged thereon.

In order to attain the above object, according to the present invention, there is also provided a light source device comprising: a primary light source; a light guide having a light incident face on which light emitted from the primary light source is incident, guiding the incident light, and having a light emission face from which the incident light is emitted; and a light deflecting device disposed so as to be adjacent to the light emission face of the light guide, wherein the light deflecting device has a light incident surface disposed so as to face the light emission face of the light guide and a light emission surface at the opposite side to the light incident surface, plural elongated prisms arranged in parallel to one another are formed on the light incident surface of the light deflecting device, each of the elongated prisms has two prism faces, and when there are assumed plural virtual elongated prisms arranged at the same arrangement pitch as the elongated prisms of the light deflecting device, each virtual elongated prism having a vertical angle θ of 50 to 70°, and the peak emission light in the light emission distribution of light emitted from the light emission face of the light guide being incident on one virtual prism face of the virtual elongated prism, internally totally reflected by another virtual prism face and then emitted in a desired direction from the light emission surface, at least one prism face of each elongated prism is designed to have a convex surface shape with respect to the shape of each of the virtual elongated prisms, and, the light emission face of the light guide and/or the back surface of the light guide at the opposite side to the light emission face is a surface having a directive light emission function and having an average slant angle of 0.5 to 15°.

In an aspect of the present invention, each of the elongated prisms has a common base with each virtual elongated prism, and the convex surface shape is set to a substantially cylindrical surface shape under the condition that the value (r/P) of the radius of curvature r normalized by the arrangement pitch P of the elongated prisms is equal to 2 to 80. In an aspect of the present invention, the ratio (d/P) of the maximum distance between the convex-surface-shaped prism face of each of the elongated prisms of the light deflecting device and the virtual prism face of each virtual elongated prism to the arrangement pitch P of the elongated prisms is equal to 0.05 to 5%. In an aspect of the present invention, a slant angle of a virtual prism face of each of the virtual elongated prisms at the near side to the primary light source is 45° or more. In an aspect of the present invention, each of the virtual elongated prisms has an equilateral triangular cross-section. In an aspect of the present invention, the surface having the directive light emission function is a roughened surface or a surface having many elongated lens arranged thereon.

In order to attain the above object, according to the present invention, there is also provided a light source device comprising: a primary light source; a light guide having a light incident face on which light emitted from the primary light source is incident, guiding the incident light, and having a light emission face from which the incident light is emitted; and a light deflecting device disposed so as to be adjacent to the light emission face of the light guide, and provided with a light incident surface having plural elongated prisms which are arranged in parallel to one another so as to confront the light emission face of the light guide, and a light emission surface at the opposite side to the light incident surface, wherein the half-width B of the light emission distribution of light emitted from the light emission face of the light guide within a plane vertical to the light incident face and the light emission face is equal to or less than 36°, and the half-width A of the light emission distribution of light emitted from the light emission surface of the light deflecting device within a plane vertical to the light incident face and the light emission face is equal to 30 to 95% of the half-width B.

In an aspect of the present invention, the half-width A of the light emission distribution of light emitted from the light emission surface of the light deflecting device within a plane vertical to the light incident face and the light emission face is equal to 30 to 80% of the half-width B. In an aspect of the present invention, the half-width A of the light emission distribution of light emitted from the light emission surface of the light deflecting device within a plane vertical to the light incident face and the light emission face is equal to 30 to 70% of the half-width B. In an aspect of the present invention, the half-width A of the light emission distribution of light emitted from the light emission surface of the light deflecting device within a plane vertical to the light incident face and the light emission face is 5 to 25°.

In an aspect of the present invention, each of the elongated prisms has two prism faces, and when there are assumed plural virtual elongated prisms arranged at the same arrangement pitch as the elongated prisms of the light deflecting device, each virtual elongated prism having a vertical angle θ of 50 to 70°, and the peak emission light in the light emission distribution of light emitted from the light emission face of the light guide being incident on one virtual prism face of the virtual elongated prism, internally totally reflected by another virtual prism face and then emitted in a desired direction from the light emission surface, at least one prism face of each elongated prism is designed to have a convex surface shape with respect to the shape of each of the virtual elongated prisms.

In an aspect of the present invention, each of the elongated prisms has a common base with each virtual elongated prism, and the convex surface shape is set to a substantially cylindrical surface shape under the condition that the value (r/P) of the radius of curvature r normalized by the arrangement pitch P of the elongated prisms is equal to 2 to 80. In an aspect of the present invention, the ratio (d/P) of the maximum distance between the convex-surface-shaped prism face of each of the elongated prisms of the light deflecting device and the virtual prism face of each virtual elongated prism to the arrangement pitch P of the elongated prisms is equal to 0.05 to 5%. In an aspect of the present invention, a slant angle of a virtual prism face of each of the virtual elongated prisms at the near side to the primary light source is 45° or more. In an aspect of the present invention, each of the virtual elongated prisms has an equilateral triangular cross-section. In an aspect of the present invention, the light emission face of the light guide and/or the back surface of the light guide at the opposite side to the light emission face is a surface having a directive light emission function. In an aspect of the present invention, an average slant angle of the surface having the directive light emission function is 0.5 to 15°. In an aspect of the present invention, the surface having the directive light emission function is a roughened surface or a surface having many elongated lens arranged thereon.

In order to attain the above object, according to the present invention, there is also provided a light source device comprising: a primary light source; a light guide having a light incident face on which light emitted from the primary light source is incident, guiding the incident light, and having a light emission face from which the incident light is emitted; and a light deflecting device disposed so as to be adjacent to the light emission face of the light guide, and provided with a light incident surface having plural elongated prisms which are arranged in parallel to one another so as to confront the light emission face of the light guide, and a light emission surface at the opposite side to the light incident surface, wherein the half-width B of the light emission distribution of light emitted from the light emission face of the light guide within a plane vertical to the light incident face and the light emission face is more than 36°, and the half-width A of the light emission distribution of light emitted from the light emission surface of the light deflecting device within a plane vertical to the light incident face and the light emission face is equal to 30 to 70% of the half-width B.

In an aspect of the present invention, the half-width A of the light emission distribution of light emitted from the light emission surface of the light deflecting device within a plane vertical to the light incident face and the light emission face is equal to 30 to 60% of the half-width B. In an aspect of the present invention, the half-width A of the light emission distribution of light emitted from the light emission surface of the light deflecting device within a plane vertical to the light incident face and the light emission face is equal to 30 to 50% of the half-width B. In an aspect of the present invention, the half-width A of the light emission distribution of light emitted from the light emission surface of the light deflecting device within a plane vertical to the light incident face and the light emission face is less than 25°.

In an aspect of the present invention, each of the elongated prisms has two prism faces, and when there are assumed plural virtual elongated prisms arranged at the same arrangement pitch as the elongated prisms of the light deflecting device, each virtual elongated prism having a vertical angle θ of 50 to 70°, and the peak emission light in the light emission distribution of light emitted from the light emission face of the light guide being incident on one virtual prism face of the virtual elongated prism, internally totally reflected by another virtual prism face and then emitted in a desired direction from the light emission surface, at least one prism face of each elongated prism is designed to have a convex surface shape with respect to the shape of each of the virtual elongated prisms.

In an aspect of the present invention, each of the elongated prisms has a common base with each virtual elongated prism, and the convex surface shape is set to a substantially cylindrical surface shape under the condition that the value (r/P) of the radius of curvature r normalized by the arrangement pitch P of the elongated prisms is equal to 2 to 80. In an aspect of the present invention, the ratio (d/P) of the maximum distance between the convex-surface-shaped prism face of each of the elongated prisms of the light deflecting device and the virtual prism face of each virtual elongated prism to the arrangement pitch P of the elongated prisms is equal to 0.05 to 5%. In an aspect of the present invention, a slant angle of a virtual prism face of each of the virtual elongated prisms at the near side to the primary light source is 45° or more. In an aspect of the present invention, each of the virtual elongated prisms has an equilateral triangular cross-section. In an aspect of the present invention, the light emission face of the light guide and/or the back surface of the light guide at the opposite side to the light emission face is a surface having a directive light emission function. In an aspect of the present invention, an average slant angle of the surface having the directive light emission function is 0.5 to 15°. In an aspect of the present invention, the surface having the directive light emission function is a roughened surface or a surface having many elongated lens arranged thereon.

DETAILED DESCRIPTION OF THE PREFERRED EMBODIMENTS

Preferred embodiments according to the present invention will be described hereunder with reference to the accompanying drawings.

Figure 1:
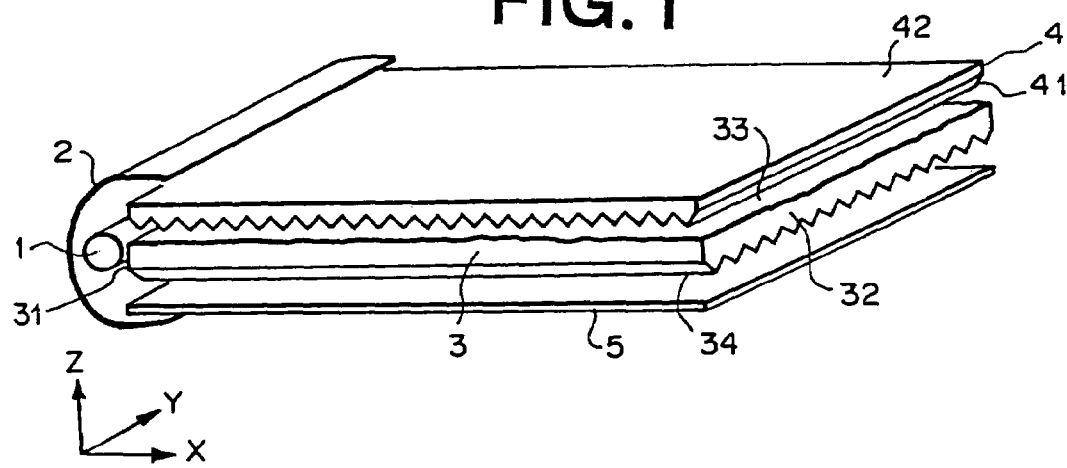
FIG. 1 is a schematic perspective view showing a planar light source device according to the present invention.

FIG. 1 is a schematic perspective view showing an embodiment of a planar light source device according to the present invention.

As shown in FIG. 1, the planar light source device of the present invention comprises a light guide having a light incident face 31 on at least one side end surface thereof, and a light emission face 33 on a surface thereof which is substantially perpendicular to the light incident face 31, a primary light source 1 that is disposed so as to confront the light incident face 31 of the light guide 3 and covered by a light source reflector 2, a light deflecting device 4 disposed on the light emission face of the light guide 3, and a light reflecting element 5 disposed so as to confront the back surface 34 of the light guide 3 which is at the opposite side to the light emission face 33.

The light guide 3 is disposed in parallel to the XY plane, and it is designed in a rectangular plate shape as a whole. The light guide 3 has four side end surfaces, and at least one side end surface of a pair of side end surfaces parallel to the YZ plane is set as the light incident face 31. The light incident face 31 is disposed so as to confront the light source 1, and light emitted from the light source 1 is incident on the light incident face 31 and introduced into the light guide 3. In the present invention, a light source may be disposed at the other side end surface (side end surface 32 or the like) confronting the light incident face 31.

The two principal surfaces which are substantially perpendicular to the light incident face 31 of the light guide 3 are located substantially in parallel to the XY plane, and any one of the surfaces (the upper surface in FIG. 1) is set as the light emission face 33. A directive light emission function structure comprising a roughened surface or a directive light emission function structure comprising a lens face achieved by disposing many elongated lenses such as elongated prisms, lenticular lenses, V-shaped grooves or the like substantially in parallel to the light incident face 31 is disposed on at least one of the light emission face 33 and the back surface 34, whereby light having directivity in a light emission distribution on the plane (XZ plane) perpendicular to the light incident face 31 and the light emission face 33 is emitted from the light emission face 33 while the light incident on the light incident face 31 is guided through the light guide 3. The angle at which the direction of the peak in the light emission distribution on the XZ plane intersects to the light emission face 31 is represented by α. The angle α is preferably set to 10 to 40°, and the half-width of the light emission distribution is preferably equal to 10 to 40°.

With respect to the roughened surface or the elongated lenses formed on the surface of the light guide 3, from the viewpoint of keeping uniformity of luminance on the light emission face 33, it is preferable that the average slant angle θ a based on ISO 4287/1-1984 is set to a value in the range from 0.5 to 15°. The average slant angle θ a is more preferably set to a value in the range from 1 to 12°, and further preferably it is set to a value in the range from 1.5 to 11°. It is preferable that the optimum range is set for the average slant angle θ a in accordance with the ratio (L/t) of the thickness (t) of the light guide 3 and the length (L) thereof in the direction along which the incident light propagates. That is, when a light guide having L/t of about 20 to 200 is used, the average slant angle θ a is preferably set in the range from 0.5 to 7.5°, more preferably it is set in the range from 1 to 5°, and further more preferably it is set in the range from 1.5 to 4°. When a light guide 3 having L/t of about 20 or less is used, the average slant angle θ a is preferably set in the range from 7 to 12°, and more preferably it is set in the range from 8 to 11°.

The average slant angle θ a of the roughened surface formed on the light guide 3 can be determined as follows. That is, according to ISO4287/1-1984, the shape of the roughened surface is measured by using a probe type surface roughness tester, and the average slant angle θ a is calculated from the slant function f(x) (x represents the coordinate in the measurement direction) thus achieved by using the following equations (1) and (2). Here, L represents the measurement length, and Δa represents the tangent of the average slant angle θ a.

$$\Delta a = (1/L) \int_0^L |(d/dx)f(x)| \quad (1)$$

$$\theta a = \tan^{-1}(\Delta a) \quad (2)$$

With respect to the light guide 3, the light emission rate of the light guide 3 is preferably set in the range of 0.5 to 5%, and it is more preferably set in the range from 1 to 3%. As the light emission rate is less than 0.5%, the amount of light emitted from the light guide 3 is reduced, and thus there is a tendency that sufficient luminance is not achieved. On the other hand, if the light emission rate is larger than 5%, a large amount of light is emitted in the neighborhood of the light source 1, and attenuation of light in the X-direction on the light emission face 33 is remarkable, so that there is a tendency that the uniformity of the luminance on the light emission face 33 is reduced. Therefore, light having such an emission characteristic of high directivity that the angle α of the peak light in the light emission distribution of light emitted from the light emission face is within the range from 10 to 40° and the half-width of the light emission distribution on the XZ plane perpendicular to the light incident face and the light emission face is within the range from 10 to 40° can be emitted from the light guide 3 by setting the light emission rate of the light guide 3 in the range from 0.5 to 5% as described above, and the emission direction can be efficiently deflected by the light deflecting device 4, thereby providing a planar light source device having high luminance.

In the present invention, the light emission rate of the light guide 3 is defined as follows. The relationship between the light intensity ($I_o$) of the emitted light at the end edge of the light emission face 33 at the light incident face 31 side and the light intensity (I) of the emitted light at a distance L from the end edge of the light emission face 33 at the light incident face 31 side satisfies the following equation (3) wherein t represents the thickness of the light guide (the dimension in the Z direction).

$$I = I_o \cdot a(1-a)^{L/t} \quad (3)$$

Here, the constant α represents the light emission rate, and it means the rate (%) of light emission from the light guide 3 per unit length (the length corresponding to the thickness t of the light guide) on the light emission face 33 in the X direction perpendicular to the light incident face 31. The logarithm of the light intensity of the emitted light from the light emission face 23 is plotted on the axis of ordinates and (L/t) is plotted on the axis of abscissas, and the light emission rate α can be calculated from the gradient of the plot result.

In order to control the directivity of the emitted light from the light guide 3 on a plane (YZ plane) parallel to the light source 1, it is preferable that a lens face having many elongated lenses which are arranged on the lens face and extend in the direction (X direction) substantially perpendicular to the light incident face 31 is formed on the other principal surface to which no directive light emission function structure is provided. In the embodiment shown in FIG. 1, the roughened surface is formed on the light emission face 33, and the lens face having the many elongated lenses arranged thereon so as to extend in the direction (X direction) substantially perpendicular to the light incident face 31 is formed on the back surface 34. In the present invention, contrary to the embodiment of FIG. 1, the lens face may be formed on the light emission face 33 while the roughened surface is formed on the back surface 34. As shown in FIG. 1, when the elongated lenses are formed on the back surface 34 or the light emission face 33 of the light guide 3, elongated prisms, lenticular lenses, V-shaped grooves each of which extends substantially in the X direction may be used as the elongated lenses, and it is preferable that elongated prisms each having substantially triangular shape in section are used.

In the present invention, when the elongated prisms are formed as the elongated lenses on the light guide 3, the vertical angle thereof is preferably set in the range from 70 to 150°. If the vertical angle is set in this range, the emitted light from the light guide 3 can be sufficiently concentrated and the luminance as the planar light source device can be sufficiently enhanced. That is, by setting the vertical angle of the elongated prism within this range, this device can emit concentrated light which has the half-width of the light emission distribution in the range from 35 to 65° on the plane containing the peak light of the light emission distribution and perpendicular to the XZ plane, thereby enhancing the luminance as the planar light source device. When the elongated prisms are formed on the light emission face 33, the vertical angle thereof is preferably set in the range from 80 to 100°. When the elongated prisms are formed on the back surface 34 is formed on the back surface 34, the vertical angle thereof is preferably set in the range from 70 to 80° or in the range from 100 to 150°.

In the present invention, in place of or in combination with the formation of the light emission function structure on the light emission face 33 or the back surface 34 as described above, light diffusing fine particles may be mixed and dispersed in the light guide to bring the directive light emission function to the light guide. Further, the shape of the light guide 3 is not limited to that of FIG. 1, and various shapes such as a wedge-shape, a boat-shape, etc. may be used.

The light deflecting device 4 is disposed on the light emission face 33 of the light guide 3. The two principal surfaces 41, 42 of the light deflecting device 4 are confronted to each other, and located in parallel to the XY plane as a whole. One of the principal surfaces which faces the light emission face 33 of the light guide is set as a light incident surface 41, and the other principal surface is set as a light emission surface 42. The light emission surface 42 is designed as a flat surface parallel to the light emission face 33 of the light guide 3. The light incident surface 41 is designed as a prism-formed surface having many elongated prisms which are arranged in parallel to one another so as to extend in the Y direction. The prism-formed surface may be provided with a flat portion having a relatively small width between the respective neighboring elongated prisms (for example, a flat portion having a width that is substantially equal to the pitch of the elongated prisms or less). However, from the viewpoint of the using efficiency of light, it is preferable that the elongated prisms are formed continuously without providing any flat portion.

Figure 2:
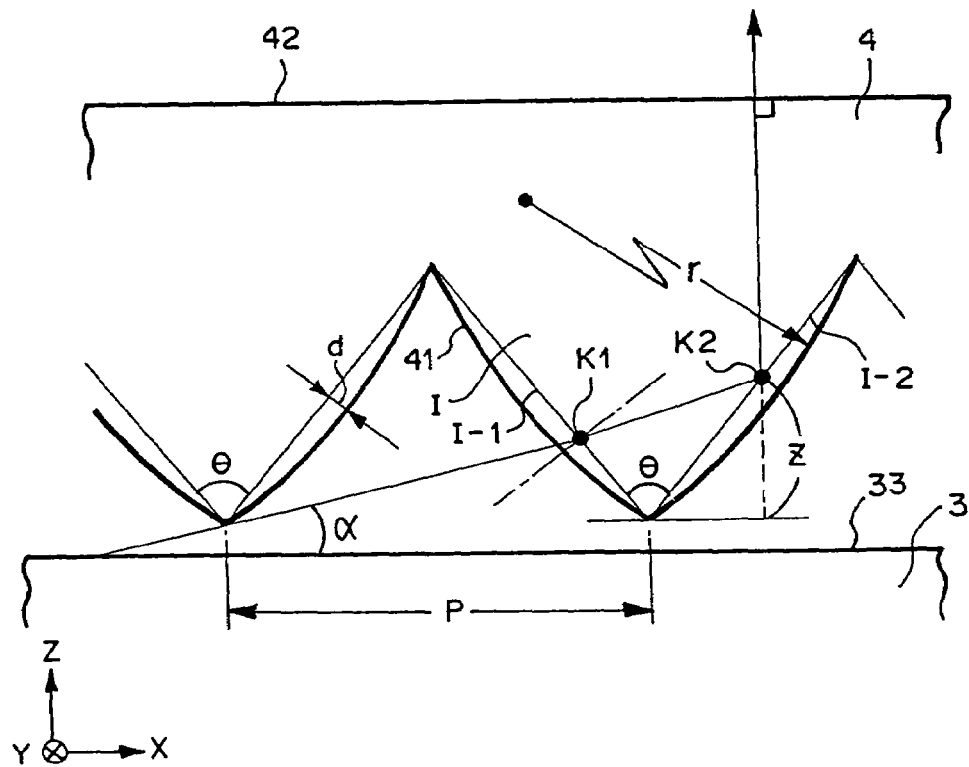
FIG. 2 is a diagram showing the shape of elongated prisms on the light incident surface of a light deflecting device.

FIG. 2 is a diagram showing the shape of each elongated prism of the light incident surface 41 of the light deflecting device 4. The shape of each elongated prism of the light incident surface 41 is set as follows.

That is, the arrangement pitch of the elongated prisms is set to P, and a virtual elongated prism I having a triangular shape in section is first set. The intersecting angle between the two virtual prism faces I-1 and I-2 of the virtual elongated prism I (that is, the vertical angle of the virtual elongated prism) is set to θ. The virtual prism vertical angle θ is set so that the peak emitted light (slant angle α) in the intensity distribution on the XZ plane of light coming from the light emission face 33 of the light guide 3 is incident on the virtual elongated prism I, internally totally reflected by the virtual prism face I-2 and then propagates in the normal direction for example of the light emission surface 42. When the peak emitted light of light emitted from the light emission surface 42 of the light deflecting device 4 is directed approximately to the normal direction of the light emission surface 42 (for example, within the range of ±10° from the normal direction), the virtual prism vertical angle θ is preferably set in the range from 50 to 70°, more preferably in the range from 55 to 70°, and further more preferably in the range from 60 to 70°. Further, in order to efficiently deflect the emitted light from the light guide 3 to a desired direction by the light deflecting device 4, the slant angle (an intersecting angle to the light emission surface 42) of one virtual prism face of the virtual elongated prism is preferably set to 45° or more, more preferably to 47° or more, and further more preferably to 50° or more.

Next, by setting as a standard the shape of the virtual elongated prism I for which the shape is set as described above, the shape of an actual elongated prism is set so that one prism face has a convex-shaped curved surface. Specifically, the shape of the actual elongated prism is preferably set as follows. There is considered such virtual light that the peak emitted light (slant angle α) in the light emission distribution of light emitted from the light emission face 33 of the light guide 3 skirts the apex portion of a neighboring virtual elongated prism at the primary light source 1 side and then incident on the virtual prism I. Here, the position at which the virtual light passes over the virtual prism face I-1 is represented by K1, and the position at which the virtual light reaches the virtual prism face I-2 is represented by K2.

Typically, it is preferable that the whole surface of a part of the actual prism face which is located to be nearer to the light emission surface 42 than the position K2 is shaped like a convex surface. On the other hand, the surface of the other area of the actual prism face which is located to be nearer to the light incident surface 41 (that is, farther from the light emission surface 42) than the internal total reflection position K2 of the virtual prism face 1-2 (hereinafter referred to as "area below K2") may be shaped like a flat surface or convex surface. In any case, it is preferable to extend the shape of the actual prism face in the neighborhood of the light emission surface 42 side over the position K2. The apex portion of the actual elongated prism is not required to be coincident with the apex portion of the virtual elongated prism.

At the position nearer to the light emission surface 42 than the internal total reflection position K2 of the virtual prism face I-2 in the virtual elongated prism I, the shape of the actual elongated prism is preferably set to such a convex surface shape that at least a part or the whole part thereof has a prism-face slant angle larger than the slant angle of the virtual prism face I-2 of the virtual elongated prism I.

This means that at the positions in the Z direction at which the dimension z shown in FIG. 2 (the distance in the Z direction between the apex point of the elongated prism and the internal reflection position K2 of the virtual prism face I-2) is larger than the value indicated by the following equation:

$$z = \{(P \cdot \tan\alpha \cdot \cot[\theta/2])/(\tan\alpha + \cot[\theta/2])\} \cdot [\cot[\theta/2] + \{\cot\theta/(\cot[\theta/2] - \cot\theta)\}],$$

the actual prism face has a slant angle larger than that of the virtual prism face I-2 of the virtual elongated prism I indicated by the following equation:

$$n \cos[3\theta/2] \sin(\alpha - [\theta/2])$$

(in the equations, n represents the refractive index of the elongated prism). The above positions in the Z direction above the position K2 will be hereinafter referred to as "area above K2".

By setting the shape of the elongated prism of the light incident surface 41 as described above, the distribution angle (half-width) of the light emitted from the light deflecting device 4 can be reduced. The reason is as follows. That is, light reaching the positions nearer to the light emission surface 42 than the internal total reflection position K2 of the virtual prism face I-2 of the virtual elongated prism I (i.e., the area above K2) is a flux of light beams passing through a lower position than the apex portion of the neighboring virtual elongated prism at the primary light source side at a slant angle larger than α. Accordingly, the direction of the distribution peak thereof corresponds to a direction of slant angle larger than α, and the direction of the distribution peak of the internally totally reflected light thereof corresponds to a direction that is slant from the normal direction of the light emission surface 42 toward the direction along the virtual prism face of the internal total reflection. Such light acts to expand the angular distribution of the emitted light from the light emission surface 42. Therefore, in order to emit light while concentrating the light amount to a specific direction, in at least a part of the area nearer to the light emission surface 42 than the internal total reflection position K2 of the virtual prism face I-2 of the virtual elongated prism I (i.e., the area above K2), the slant angle of the prism face of the actual elongated prism is set to be larger than the slant angle of the corresponding virtual prism face, whereby the propagating direction of light which is actually internally totally reflected in this area can be corrected to be more moved toward the normal direction of the light emission surface 42 than the virtual reflected light from the virtual prism face, so that the luminance can be enhanced and the visual field can be narrowed.

The convex surface as described above may be formed in the whole part of the area (area above K2) nearer to the light emission surface 42 than the internal total reflection position K2 of the virtual prism face I-2 of the virtual elongated prism I while the shape of the virtual prism face I-2 of the virtual elongated prism is left without any modification in the area which is farther from the light emission surface 42 than the internal total reflection position K2 (i.e., the area below K2). Alternatively, the whole prism surface containing the area below K2 may be designed as a convex surface. As such a convex surface shape may be used a convex cylindrical surface shape having a radius of curvature r in which at least base portion is common to the virtual elongated prism.

Here, the value (r/P) of the radius of curvature r normalized by the pitch P is preferably set in the range from 2 to 80, more preferably in the range from 7 to 30, further more preferably in the range from 7.5 to 20, and specifically in the range from 8 to 15. By setting the value of r/P in this range, the half-width of the light emission distribution of light emitted from the light emission surface 42 of the light deflecting device 4 can be sufficiently narrowed, and the luminance as the light source device can be sufficiently increased. For example, when the pitch of the elongated prisms is set to 40 to 60 $\mu$m, the radius of curvature r is preferably set in the range from 250 to 3000 $\mu$m, more preferably in the range from 350 to 1000 $\mu$m and further more preferably in the range from 350 to 700 $\mu$m.

Further, the convex surface shape of each elongated prism of the light deflecting device 4 is preferably set to such a relatively moderate curved surface that the ratio (d/P) of the maximum distance d between the virtual prism face of the virtual elongated prism and the actual prism face of the convex surface shape and the arrangement pitch P of the elongated prisms is equal to a value in the range from 0.05 to 5%, more preferably in the range from 0.1 to 3%, further more preferably in the range from 0.2 to 2%, and specifically in the range from 0.7 to 1.5%. If the value of d/P is more than 5%, there is such a tendency that the light concentration effect by the light deflecting device is lost and divergence of light occurs. Further, there is also such a tendency that the half-width of the light emission distribution of light emitted from the light emission surface 42 of the light deflecting device 4 cannot be sufficiently narrowed. Conversely, if the value of d/P is less than 0.05%, there is such a tendency that the light concentration effect by the light deflecting device 4 is lowered and there is also such a tendency that the half-width of the light emission distribution of light emitted from the light emission surface 42 of the light deflecting device 4 cannot be sufficiently narrowed.

In the present invention, the convex surface shape of each elongated prism of the light deflecting device 4 is not limited to the arcuate shape in section having the radius of curvature r as described above, and any non-spherical convex surface shape may be used insofar as the value of d/P thereof is within the above range.

In the present invention, the prism face having the convex surface shape as described above is preferably formed in each elongated prism at least on a surface which is far away from the primary light source 1. This arrangement can reduce the distribution angle of light emitted from the light deflecting device 4 when a primary light source is also disposed on the end surface 32 of the light guide 3. When the rate at which light propagating through the light guide 3 is reflected by and returns from the end surface 32 at the opposite side to the light incident face 31 is relatively high, the prism face located at the side near to the primary light source 1 is preferably designed to have a convex surface shape. Particularly, the prism face located at the side near to the primary light source I is preferably shaped to be symmetrical with the actual prism face corresponding to the virtual prism face I-2 with respect to the normal direction of the light emission surface 42. On the other hand, when the rate at which the light propagating through the light guide 3 is reflected by and returns from the end surface 32 at the opposite side to the light incident face 31 is relatively low, the prism face at the side near to the primary light source 1 may be designed to have a flat surface. Further, when it is required to sharpen the apex portions of the elongated prisms (form the edges of the apex portions clearly) in order to suppress occurrence of a sticking phenomenon when the light deflecting device 4 is mounted on the light guide 3, it is preferable that the prism face at the side near to the primary light source 1 is designed to have a flat surface because the shape of a shape-transferring face of a molding member for forming the elongated prisms can be more accurately formed as compared with a case where both the prism faces are designed to have a convex surface, and thus the apex portions of the elongated prisms can be more easily sharpened.

In the light deflecting device of the present invention, in order to accurately form a desired prism shape to achieve stable optical performance, and to suppress abrasion and deformation of the apex portions of elongated prisms when a fabricating work is carried out or the device is used as a planar light source device, a flat portion or a curved surface portion may be formed at the apex portion of each elongated prism. In this case, the width of the flat portion or the curved surface portion formed at the apex portion of each elongated prism is preferably set to 3 $\mu$m or less from the viewpoint of suppressing reduction of luminance as a planar light source device or occurrence of a non-uniform pattern of luminance due to the sticking phenomenon, and it is more preferably set to 2 $\mu$m, and further more preferably it is set to 1 $\mu$m or less.

In the present invention, in order to adjust the visual field angle and enhance the quality as the planar light source device, a light diffusion layer may be formed at the light emission surface side of the light deflecting device or light diffusing agent may be contained in the elongated prisms. The light diffusion layer may be formed by disposing a light diffusion sheet on the light emission surface of the light deflecting device or integrally forming a light diffusion layer with the light deflecting device at the light emission surface side. In this case, in order to suppress degradation of the luminance enhancing effect due to the narrowing of the visual field by the light deflecting device at maximum, it is preferable that a light diffusion layer having anisotropic diffusing property is formed to diffuse light in a desired direction. Transparent fine particles having a refractive index different from that of the elongated prisms may be used as the light diffusing agent to be dispersed in the elongated prisms. In this case, in order to suppress degradation of the luminance enhancing effect due to the narrowing of the visual field by the light deflecting device at maximum, the content, the particle size, the refractive index, etc. of the light diffusing agent are suitably set.

Figure 5:
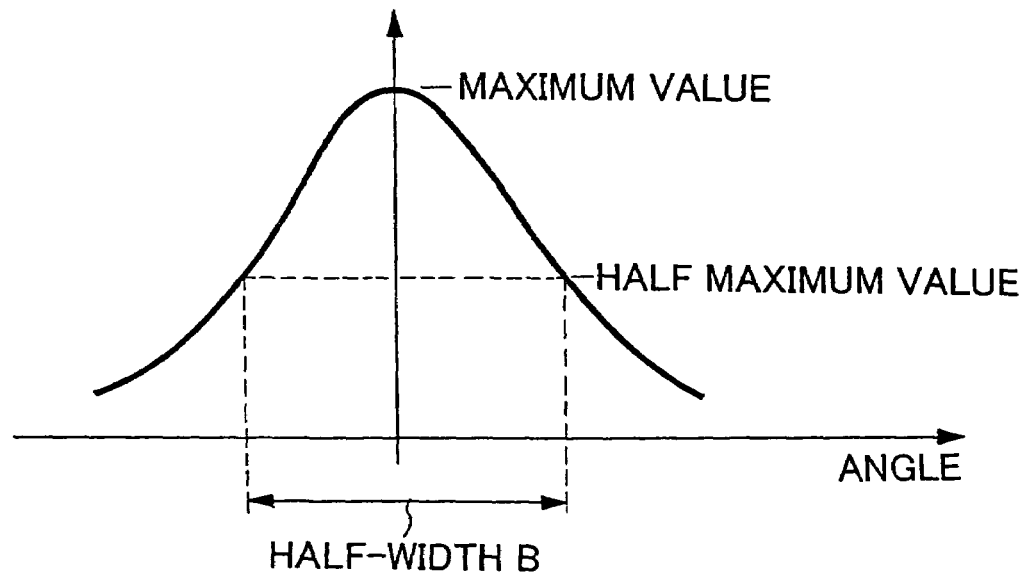
FIG. 5 shows light emission distribution of light emitted from light emission face 33 of light guide 3.

As described above, by mounting the light deflecting device 4 described above on the light emission face 33 of the light guide 3 so that the prism-formed surface thereof corresponds to the light incident side, the light emission distribution on the XZ plane of the directive emitted light emitted from the light emission face 33 of the light guide 3 (shown in FIG. 5) can be more narrowed, and the luminance as the light source device can be enhanced, and the visual field can be narrowed. The half-width of the light emission distribution on the XZ plane of the light emitted from the light deflecting device 4 as described above is preferably set in the range from 5 to 25°, more preferably in the range from 10 to 20°, and further more preferably in the range from 12 to 18°. By setting the half-width of the light emission distribution to 5° or more, unclearness of images, etc. due to excessively narrowing of the visual field can be prevented, and by setting the half-width of the light emission distribution to 25° or less, the luminance can be enhanced and the visual field can be narrowed.

Figure 4:
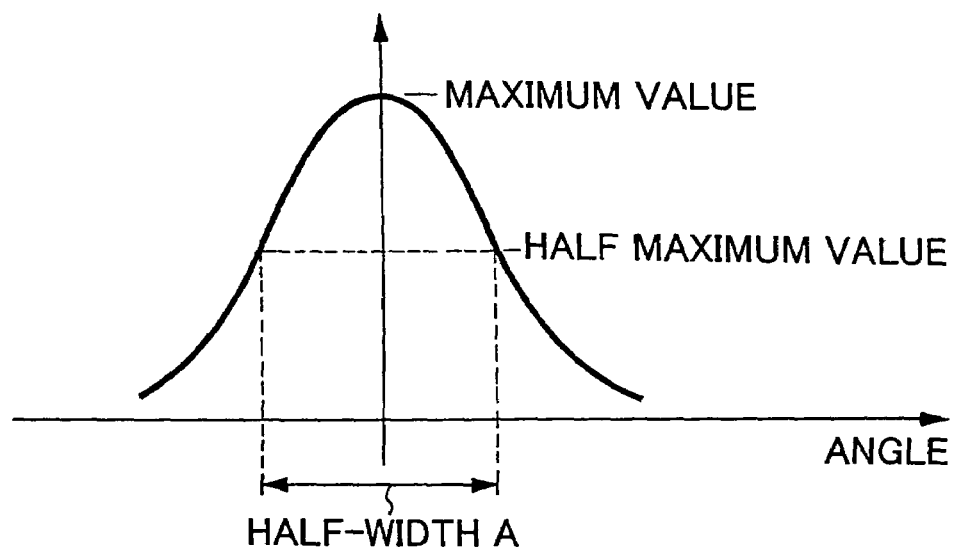
FIG. 4 shows light emission distribution of light emitted from light emission surface 42 of light deflecting device 4.

The narrowing of the visual field by the light deflecting device 4 of the present invention is affected by the spreading degree (half-width) of the light emission distribution (within the XZ plane) of light emitted from the light emission face 33 of the light guide 3 (shown in FIG. 5), and thus the rate of the half-width A of the light emission distribution of light emitted from the light emission surface 42 of the light deflecting device 4 (shown in FIG. 4) to the half-width B of the light emission distribution of light emitted from the light emission face 33 of the light guide 3 is varied in accordance with the half-width B of the light emission distribution of light from the light guide 3. For example, when the half-width B of the light emission distribution of light from the light guide 3 is less than 26°, the half-width A is preferably set in the range from 30 to 95% with respect to the half-width B, more preferably in the range from 30 to 80%, and further more preferably in the range from 30 to 70%. When the half-width B of the light emission distribution of light from the light guide 3 is not less than 26°, the half-width A is preferably set in the range from 30 to 80% with respect to the half-width B, more preferably in the range from 30 to 70%, and further more preferably in the range from 30 to 60%. Particularly when the half-width B of the light emission distribution of light from the light guide 3 is in the range from 26 to 36°, the half-width A is preferably set in the range from 30 to 80% with respect to the half-width B, more preferably in the range from 30 to 70%, and further more preferably in the range from 30 to 60%. Further, when the half-width B of the light emission distribution of light from the light guide 3 exceeds 36°, the half-width A is preferably set in the range from 30 to 70% with respect to the half-width B, more preferably in the range from 30 to 60%, and further more preferably in the range from 30 to 50%.

As described above, according to the present invention, as the half-width of the light emission distribution of light from the light guide 3 increases, the effect of the narrowing of the visual field is enhanced. Therefore, from the viewpoint of the efficiency of the narrowing of the visual field, the light deflecting device is preferably used in combination with a light guide having the half-width B of the light emission distribution of 26° or more, and it is more preferably used in combination with a light guide having the half-width B of the light emission distribution more than 36°. When the half-width of the light emission distribution of light from the light guide 3 is small, the effect of the narrowing of the visual field is lowered. However, as the half-width of the light emission distribution of light from the light guide 3 is reduced, the luminance is enhanced. Therefore, from the viewpoint of enhancing the luminance, the light deflecting device is preferably used in combination with a light guide having the half-width B of the light emission distribution which is less than 26°.

The primary light source 1 is a linear light source extending in the Y direction, and a fluorescent lamp or a cold cathode tube may be used as the primary light source 1. In the present invention, the primary light source 1 is not limited to a linear light source, and it may be a point light source such as an LED light source, a halogen lamp, a metal halogen lamp or the like. Particularly when it is used for a display-device having a relatively small screen size such as a cellular phone, a portable information terminal or personal digital assistants, or the like, a small point light source such as LED or the like is preferably used. The primary light source 1 may be mounted not only at one side end surface of the light guide 3, but also at the other confronting side end surface of the light guide 3 as occasion demands.

The light source reflector 2 is used to guide the light from the primary light source 1 to the light guide 3 with reduced loss. Plastic film having a metal deposited reflecting layer formed thereon is used as the material of the light source reflector 2. As shown in FIG. 1, the light source reflector 2 is folded so as to extend from the outer surface of the end edge portion of the light reflecting element 5 through the outer surface of the primary light source 1 to the end edge portion of the light emission surface of the light deflecting device 4. The light source reflector 2 may be folded so as to avoid the light deflecting device 4 and extend from the outer surface of the end edge portion of the light reflecting element 5 through the outer surface of the primary light source 1 to the end edge portion of the light emission face of the light guide 3.

The same reflecting member as the light source reflector 2 may be provided to a side end surface other than the side end surface 31 of the light guide 3. A plastic sheet having a metal deposited reflecting layer formed thereon may be used as the light reflecting element 5. In the present invention, a light reflecting layer may be formed as the light reflecting element 5 by metal deposition or the like on the back surface 34 of the light guide 3 in place of the reflecting sheet.

The light guide 3 and the light deflecting device 4 of the present invention may be formed of synthetic resin having high light transmittance. As the synthetic resin may be used methacrylic resin, acrylic resin, polycarbonate resin, polyester resin, vinyl chloride resin, or the like. The methacrylic resin is optimum because it has high light transmittance and is excellent in heat-resistance, dynamic characteristics, molding processability. It is preferable that methacrylic resin contains methyl methacrylate as main component by weight % of 80 or more.

The surface structures of the roughened surface or the elongated prism, etc. of the light guide 3 and the light deflecting device 4 are achieved by thermally pressing a transparent synthetic resin with a molding member having a desired surface structure. The shaping may be carried out simultaneously with the molding by using screen print, extrusion molding, injection molding or the like. Alternatively, the surface structure may be achieved by using thermosetting or photocurable resin or the like. Further, a roughened surface structure or an elongated lens arrangement structure formed of active energy curable resin may be formed on the surface of a transparent base member such as a transparent film or sheet of polyester resin, acrylic resin, polycarbonate resin, vinyl chloride resin, polymethacrylic imide resin or the like, or such a sheet may be integrally joined onto another transparent base member by adhesion, fusion or the like. Multi-functional (met)acrylic compounds, vinyl compounds, (met)acrylic esters, allyl compounds, metallic salts of (met)acrylic acid may be used as the active energy curable resin.

A liquid crystal device is mounted on the light emission surface (the light emission surface 42 of the light deflecting device 4) of the planar light source device comprising the primary light source 1, the light source reflector 2, the light guide 3, the light deflecting device 4 and the light reflecting element 5 as described above to fabricate a liquid crystal display device. The liquid crystal display device is viewed through the liquid crystal device from the upper side of FIG. 1 by a viewer. In the present invention, light having a sufficiently narrow distribution can be irradiated from the planar light source device to the liquid crystal device, so that gradation inversion, etc. can be prevented in the liquid crystal device and an image having excellent uniformity in luminance and hue can be displayed. In addition, light can be concentratively irradiated in a desired direction, and the using efficiency of the amount of emitted light from the primary light source for illumination in this direction can be enhanced.

Figure 3:
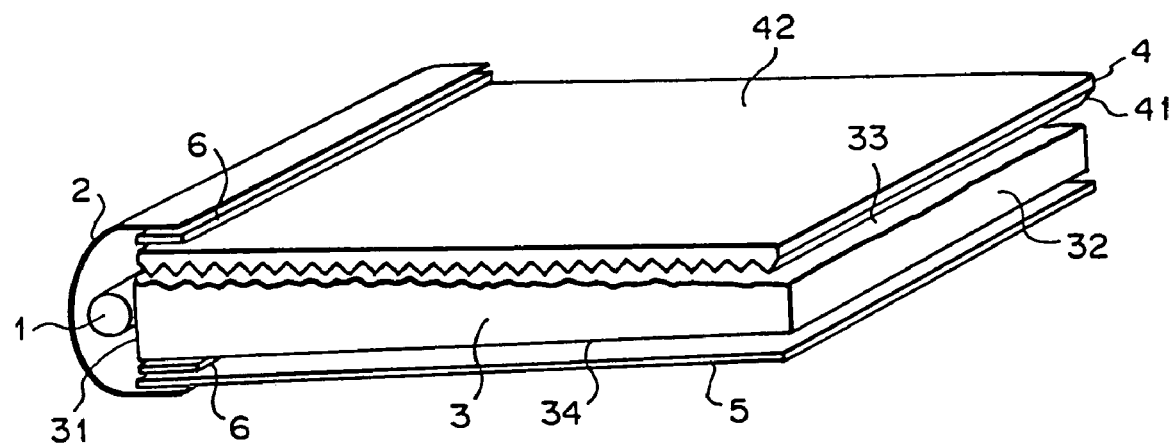
FIG. 3 is a schematic perspective view showing a planar light source device according to the present invention.

FIG. 3 is a schematic perspective view showing another embodiment of the planar light source device of the present invention. This embodiment is different from the embodiment shown in FIGS. 1 to 2 only in that the back surface 34 of the light guide 3 is designed as a flat surface, the light guide 3 is designed in a wedge form so that the thickness thereof is gradually reduced from the light incident end face 31 to the end surface 32 at the opposite side, and a light shielding member 6 is disposed to prevent bright line and dark line in the neighborhood of the primary light source 1.

The above embodiments relate to the planar light source device, however, the present invention may be applied to a light source device that is shaped like a slender rod extending in the X direction and has a dimension in the Y direction which is five times or less of the thickness of the light guide 3. In this case, a substantially point type light source such as LED or the like may be used as the primary light source 1.

Next, the present invention will be described in more detail by using Examples. The measurement of the respective physical properties in the Examples was carried out under the following conditions.

Measurement of Luminance in Normal Direction and Half-width of Luminous Intensity of Planar Light Source Device A cold cathode tube was used as the light source, it was turned on at high frequency by applying DC 12V to an inverter (HIU-742A produced by Harison Electric Co., Ltd.) connected thereto. With respect to the luminance, the surface of the planar light source device or the light guide was divided into 3×5 squares each having 20 mm×20 mm size, and the average value of luminance values in the normal direction which were measured for the fifteen squares was calculated. With respect to the half-width of luminous intensity, black paper having a pin hole of 4 mm φ was fixed on the surface of the planar light source device or the light guide so that the pin hole was located at the center of the planar light source device or the light guide, the distance between a luminance meter and the planar light source device or the light guide was adjusted so that the measurement circle of the luminance meter was equal to 8 to 9 mm, and the rotating axis of a goniometer was rotated around the pin hole in both directions perpendicular and parallel to the longitudinal direction of the cold cathode tube. The distribution of luminous intensity of emitted light was measured while the rotating axis was rotated every 0.5° in the range from +80° to −80° in each of the directions, and the luminance in the normal direction and the half-width (the spreading angle of the distribution at a half value of the peak value) of the luminous intensity distribution were determined.

Measurement of Average Slant Angle (θa)

According to IS04287/1-1987, the surface roughness of the roughened surface was measured at a driving speed of 0.03 mm/second by a probe type surface roughness tester (SURFCOM 570A produced by Tokyo Seiki Co., Ltd.) using 010-2528 (1 μmR, 55° circular cone, diamond) as a probe. On the basis of a chart achieved through this measurement, the average line thereof was subtracted from the chart result to correct the inclination, and the average slant angle was calculated from the above equations (1) and (2).

EXAMPLE 1

A plate-shaped light guide having a mat-finished surface (average slant angle of 3.0 degrees) on one surface thereof was formed by injection molding of acrylic resin (ACRY-PET VH5#000 produced by Mitsubishi Rayon Co., Ltd.). The light guide was a wedged plate of 195 mm×253 mm in size and 3 mm-1 mm in thickness. A prism layer comprising elongated prisms made of acrylic ultraviolet curable resin having a vertical angle of 140° and a pitch of 50 μm was formed on the mirror surface side of the light guide so that the elongated prisms were continuously arranged in parallel to one another and in parallel to one side (short side: 195 mm in length) of the light guide. Further, a cold cathode tube was disposed along the long side (253 mm in length) of the light guide so as to confront one side end surface (at a side of light guide's thickness of 3 mm) corresponding to the long side of the light guide while it was covered by a light source reflector (silver reflecting film produced by Reiko Co., Ltd.). Further, a light diffusing reflecting film (E60 produced by Toray Industries, Inc.) was attached to the other side end surfaces, and a reflecting sheet was disposed on the elongated prism arrangement (back surface). The structure thus achieved was installed in a frame. With the light guide thus constructed, the light emission rate was 1.5%, the maximum peak in the luminous intensity distribution of emitted light was equal to 70° to the normal direction of the light emission face, and the half-width (half-width B) was equal to 24.5°.

Further, a prism formed surface having many elongated prisms which were continuously arranged at a pitch of 50 μm in parallel to one another so that the whole of each of both the prism faces thereof had a convex surface shape having a radius of curvature (r) shown in Table 1 was formed on one surface of polyester film of 50 μm in thickness by using acrylic ultraviolet curable resin having a refractive index of 1.5064, thereby forming a prism sheet. At this time, as virtual elongated prisms were set elongated prisms which were arranged at a pitch of 50 μm and each of which had an equilateral triangle in cross section having a vertical angle of 65.4° so that light was emitted in the normal direction to the light emission surface thereof.

The prism sheet thus achieved was disposed so that the prism formed surface faced the light emission face of the light guide and the ridgelines of the elongated prisms were in parallel to the light incident face of the light guide. The relative intensity in the peak luminance and the half-width (half-width A) in the light emission distribution on the plane perpendicular to the cold cathode tube in the planar light source device thus manufactured were determined, and the result is shown in the Table 1.

COMPARATIVE EXAMPLE 1

In the same manner as EXAMPLE 1 except that the prism faces constituting each elongated prism of the prism sheet were flat, a prism sheet having elongated prisms that were arranged at a pitch of 50 μm and respectively had an equilateral triangle in cross section having a vertical angle of 65.4 degrees was formed on one surface thereof. The prism sheet thus achieved was mounted so that the prism formed surface thereof faced the light emission face of the light guide achieved in EXAMPLE 1 and the prism ridgelines thereof were in parallel to the light incident face of the light guide. The relative intensity in the peak luminance and the half-width (half-width A) in the light emission distribution on the plane perpendicular to the cold cathode tube in the planar light source device thus manufactured were determined, and the result is shown in the Table 1.

peak in the luminous intensity distribution of emitted light was equal to 61° to the normal direction of the light emission face, and the half-width (half-width B) was equal to 39°.

Further, a prism formed surface having many elongated prisms which were continuously arranged at a pitch of 50 μm in parallel to one another so that the whole of each of both the prism faces thereof had a convex surface shape having a radius of curvature (r) shown in Table 2 was formed on one surface of polyester film of 50 μm in thickness by using acrylic ultraviolet curable resin having a refractive index of 1.5064, thereby forming a prism sheet. At this time, as virtual elongated prisms were set elongated prisms which were arranged at a pitch of 50 μm and each of which had an equilateral triangle in cross section having a vertical angle of 65.4° so that light was emitted in the normal direction to the light emission surface thereof.

The prism sheet thus achieved was disposed so that the prism formed surface faced the light emission face of the

TABLE 1

| | | Radius of Curvature r (μm) | r/P | Maximum Distance d (μm) | d/P (%) | Relative Peak Intensity | Half-width A (deg.) | Half-width A/ Half-width B (%) |
|---|---|---|---|---|---|---|---|---|
| Ex. 1 | A | 250 | 5.00 | 1.07 | 2.14 | 1.10 | 20.37 | 83 |
| | B | 375 | 7.50 | 0.71 | 1.43 | 1.33 | 15.06 | 61 |
| | C | 400 | 8.00 | 0.67 | 1.34 | 1.44 | 14.75 | 60 |
| | D | 425 | 8.50 | 0.63 | 1.26 | 1.46 | 14.78 | 60 |
| | E | 450 | 9.00 | 0.59 | 1.19 | 1.44 | 14.82 | 60 |
| | F | 475 | 9.50 | 0.56 | 1.13 | 1.44 | 14.86 | 61 |
| | G | 500 | 10.00 | 0.54 | 1.07 | 1.46 | 14.98 | 61 |
| | H | 525 | 10.50 | 0.51 | 1.02 | 1.45 | 15.09 | 62 |
| | I | 550 | 11.00 | 0.49 | 0.97 | 1.42 | 15.26 | 62 |
| | J | 575 | 11.50 | 0.47 | 0.93 | 1.40 | 15.44 | 63 |
| | K | 600 | 12.00 | 0.45 | 0.89 | 1.40 | 15.67 | 64 |
| | L | 625 | 12.50 | 0.43 | 0.86 | 1.38 | 15.86 | 65 |
| | M | 750 | 15.00 | 0.36 | 0.71 | 1.33 | 16.51 | 67 |
| | N | 1250 | 25.00 | 0.22 | 0.43 | 1.19 | 18.72 | 76 |
| | O | 2500 | 50.00 | 0.11 | 0.22 | 1.07 | 20.61 | 84 |
| | P | 3000 | 60.00 | 0.09 | 0.18 | 1.05 | 21.80 | 89 |
| | Q | 4000 | 80.00 | 0.07 | 0.14 | 1.04 | 23.02 | 94 |
| Com. Ex. 1 | | — | — | 0.00 | 0.00 | 1.00 | 27.00 | 110 |

EXAMPLE 2

A plate-shaped light guide having a mat-finished surface (average slant angle of 8.0 degrees) on one surface thereof was formed by injection molding of acrylic resin (ACRYPET VH5#000 produced by Mitsubishi Rayon Co., Ltd.). The light guide was a wedged plate of 195 mm×253 mm in size and 3 mm-1 mm in thickness. A prism layer comprising elongated prisms made of acrylic ultraviolet curable resin having a vertical angle of 140° and a pitch of 50 μm was formed on the mirror surface side of the light guide so that the elongated prisms were continuously arranged in parallel to one another and in parallel to one side (short side: 195 mm in length) of the light guide. Further, a cold cathode tube was disposed along the long side (253 mm in length) of the light guide so as to confront one side end surface (at a side of light guide's thickness of 3 mm) corresponding to the long side of the light guide while it was covered by a light source reflector (silver reflecting film produced by Reiko Co., Ltd.). Further, a light diffusing reflecting film (E60 produced by Toray Industries, Inc.) was attached to the other side end surfaces, and a reflecting sheet was disposed on the elongated prism arrangement (back surface). The structure thus achieved was installed in a frame. With the light guide thus constructed, the light emission rate was 4.5%, the maximum light guide and the ridgelines of the elongated prisms were in parallel to the light incident face of the light guide. The relative intensity in the peak luminance and the half-width (half-width A) in the light emission distribution on the plane perpendicular to the cold cathode tube in the planar light source device thus manufactured were determined, and the result is shown in the Table 2.

COMPARATIVE EXAMPLE 2

In the same manner as EXAMPLE 1 except that the prism faces constituting each elongated prism of the prism sheet were flat, a prism sheet having elongated prisms that were arranged at a pitch of 50 μm and respectively had an equilateral triangle in cross section having a vertical angle of 65.4 degrees was formed on one surface thereof. The prism sheet thus achieved was mounted so that the prism formed surface thereof faced the light emission face of the light guide achieved in EXAMPLE 2 and the prism ridgelines thereof were in parallel to the light incident face of the light guide. The relative intensity in the peak luminance and the half-width (half-width A) in the light emission distribution on the plane perpendicular to the cold cathode tube in the planar light source device thus manufactured were determined, and the result is shown in the Table 2.

TABLE 2

|  |  | Radius of Curvature r (μm) | r/P | Maximum Distance d (μm) | d/P (%) | Relative Peak Intensity | Half-width A (deg.) | Half-width A/ Half-width B (%) |
|---|---|---|---|---|---|---|---|---|
| Ex. 2 | A | 250 | 5.00 | 1.07 | 2.14 | 1.07 | 24.31 | 62 |
|  | B | 375 | 7.50 | 0.71 | 1.43 | 1.24 | 18.29 | 47 |
|  | C | 400 | 8.00 | 0.67 | 1.34 | 1.32 | 17.82 | 46 |
|  | D | 425 | 8.50 | 0.63 | 1.26 | 1.33 | 17.53 | 45 |
|  | E | 450 | 9.00 | 0.59 | 1.19 | 1.35 | 17.49 | 45 |
|  | F | 475 | 9.50 | 0.56 | 1.13 | 1.36 | 17.33 | 44 |
|  | G | 500 | 10.00 | 0.54 | 1.07 | 1.37 | 17.37 | 45 |
|  | H | 525 | 10.50 | 0.51 | 1.02 | 1.38 | 17.39 | 45 |
|  | I | 550 | 11.00 | 0.49 | 0.97 | 1.37 | 17.49 | 45 |
|  | J | 575 | 11.50 | 0.47 | 0.93 | 1.38 | 17.80 | 46 |
|  | K | 600 | 12.00 | 0.45 | 0.89 | 1.38 | 18.01 | 46 |
|  | L | 625 | 12.50 | 0.43 | 0.86 | 1.36 | 18.21 | 47 |
|  | M | 750 | 15.00 | 0.36 | 0.71 | 1.27 | 19.09 | 49 |
|  | N | 1250 | 25.00 | 0.22 | 0.43 | 1.12 | 21.61 | 55 |
|  | O | 2500 | 50.00 | 0.11 | 0.22 | 1.06 | 23.50 | 60 |
|  | P | 3000 | 60.00 | 0.09 | 0.18 | 1.04 | 27.30 | 70 |
|  | Q | 4000 | 80.00 | 0.07 | 0.14 | 1.02 | 29.01 | 74 |
| Com. Ex. 2 |  | — | — | 0.00 | 0.00 | 1.00 | 31.20 | 80 |

INDUSTRIAL APPLICABILITY

As described above, according to the present invention, as at least one prism face of each elongated prism formed on the light incident surface of the light deflecting device is designed in a convex surface shape on the basis of the shape of the virtual elongated prism that is set as a standard in accordance with the slant angle of the peak emitted light from the light guide, the efficiency at which the light emitted from the primary light source is concentratively irradiated in a desired viewing direction (i.e, the using efficiency of the light amount of the primary light source) is high, and also the light emission surface of the light deflecting device is flat, whereby the light deflecting device can be simplified in structure and easily molded. Particularly, according to the present invention, the prism face on the light incident surface of the light deflecting device is designed in such a convex surface shape that the slant angle of the prism face is larger than the slant angle of the virtual prism face in an area nearer to the light emission surface than the position of the virtual elongated prism which is set in accordance with the slant angle of the peak emitted light from the light guide, whereby the efficiency at which the light emitted from the primary light source is concentratively emitted in a desired viewing direction (i.e., the using efficiency of the light amount of the primary light source) can be enhanced and also there can be provided a light source device in which the light emission surface of the light deflecting device is designed to be flat and thus the light deflecting device can be simplified in structure and easily molded.

What is claimed is:

1. A light deflecting device comprising:
   a light incident surface; and
   a light emission surface at an opposite side to the light incident surface,
   wherein plural elongated prisms arranged in parallel to one another are formed on the light incident surface, each of the elongated prisms has two prism faces, and at least a prism face of each of the elongated prisms is designed to have a convex surface shape set to such a condition that a ratio (r/P) of a radius of curvature r of the convex-surface-shaped prism face to an arrangement pitch P of said elongated prisms is equal to 7 to 30.

2. The light deflecting device of claim 1, wherein a ratio (d/P) of a maximum distance between the convex-surface-shaped prism face of each of said elongated prisms and a plane including an apex-side edge and a base-side edge of the convex-surface-shaped prism face to the arrangement pitch P of said elongated prisms is equal to 0.05 to 5%.

3. The light deflecting device of claim 1, wherein a slant angle of a plane including an apex-side edge and a base-side edge of the convex-surface-shaped prism face of each of said elongated prisms is 45° or more.

4. The light deflecting device of claim 1, wherein a vertical angle of each of said elongated prisms is set to 50 to 70°.

5. A light deflecting device comprising:
   a light incident surface; and
   a light emission surface at an opposite side to the light incident surface,
   wherein plural elongated prisms arranged in parallel to one another are formed on the light incident surface, each of the elongated prisms has two prism faces, and at least a prism face of each of the elongated prisms is designed to have a convex surface shape, and wherein a ratio (d/P) of a maximum distance between the convex-surface-shaped prism face of each of said elongated prisms and a plane including an apex-side edge and a base-side edge of the convex-surface-shaped prism face to an arrangement pitch P of said elongated prisms is equal to 0.2 to 2%.

6. The light deflecting device of claim 5, wherein the convex surface shape of each of said elongated prisms is set to a substantially cylindrical surface shape under a condition that a ratio (r/P) of a radius of curvature r of the convex-surface-shaped prism face to the arrangement pitch P of said elongated prisms is equal to 2 to 30.

7. The light deflecting device of claim 5, wherein a slant angle of a plane including an apex-side edge and a base-side edge of the convex-surface-shaped prism face is 45° or more.

8. The light deflecting device of claim 5, wherein a vertical angle of each of said elongated prisms is set to 50 to 70°.

9. A light deflecting device comprising:
a light incident surface; and
a light emission surface at an opposite side to the light incident surface,
wherein plural elongated prisms arranged in parallel to one another are formed on the light incident surface, each of the elongated prisms has two prism faces, and at least a prism face of each of said elongated prisms is designed in a convex surface shape in at least a part of an area of said prism face,
wherein said prism face is designed in the convex surface shape in at least a part of an area nearer to the light emission surface than a position at which light skirting the apex portion of a neighboring one of said elongated prisms to pass in a direction of peak light of a distribution of light incident on another prism face of each of said elongated prisms is internally totally reflected by the prism face of each of said elongated prisms at an opposite side to said another prism face.

10. A light deflecting device comprising:
a light incident surface; and
a light emission surface at an opposite side to the light incident surface,
wherein plural elongated prisms arranged in parallel to one another are formed on the light incident surface, each of the elongated prisms has two prism faces, and at least a prism face of each of said elongated prisms is designed in a convex surface shape in at least a part of an area of said prism face,
wherein the convex surface shape of each of said elongated prisms is set to a substantially cylindrical surface shape under a condition that a ratio (r/P) of a radius of curvature r of the convex-surface-shaped prism face to an arrangement pitch P of said elongated prisms is equal to 2 to 30.

11. A light deflecting device comprising:
a light incident surface; and
a light emission surface at an opposite side to the light incident surface,
wherein plural elongated prisms arranged in parallel to one another are formed on the light incident surface, each of the elongated prisms has two prism faces, and at least a prism face of each of said elongated prisms is designed in a convex surface shape in at least a part of an area of said prism face,
wherein a ratio (d/P) of a maximum distance between the convex-surface-shaped prism face of each of said elongated prisms of said light deflecting device and a plane including an apex-side edge and a bas&side edge of the convex surface-shaped prism face to an arrangement pitch P of said elongated prisms is equal to 0.05 to 5%.

12. A light deflecting device comprising:
a light incident surface; and
a light emission surface at an opposite side to the light incident surface,
wherein plural elongated prisms arranged in parallel to one another are formed on the light incident surface, each of the elongated prisms has two prism faces, and at least a prism face of each of said elongated prisms is designed in a convex surface shape in at least a part of an area of said prism face,
wherein a slant angle of a plane including an apex-side edge and a base-side edge of the convex-surface-shaped prism face is 45° or more.

* * * * *